United States Patent [19]
Moen

[11] Patent Number: 5,438,615
[45] Date of Patent: Aug. 1, 1995

[54] METHOD OF PROVIDING MESSAGE SERVICE FOR PINLESS LIMITED ACCESS TELECOMMUNICATIONS

[75] Inventor: Arthur J. Moen, Clinton, N.J.

[73] Assignee: Teleos Incorporated, Clinton, N.J.

[21] Appl. No.: 251,732

[22] Filed: May 31, 1994

[51] Int. Cl.⁶ .................. H04M 15/00; H04M 1/56; H04M 17/00
[52] U.S. Cl. .................. 379/144; 379/111; 379/112; 379/114; 379/142
[58] Field of Search .......... 379/91, 111, 112, 114, 379/142, 144; 235/375, 377, 380, 382

[56] References Cited

U.S. PATENT DOCUMENTS

| | | | |
|---|---|---|---|
| 4,162,377 | 7/1979 | Mearns | 179/18 D |
| 4,326,123 | 4/1982 | Hosterman | 235/382 |
| 4,706,275 | 11/1987 | Kamil | 379/144 |
| 4,757,186 | 7/1988 | Heberle et al. | 379/144 |
| 4,907,252 | 3/1990 | Asano | 379/91 |
| 5,068,891 | 11/1991 | Marshall | 379/144 |
| 5,101,098 | 3/1992 | Naito | 235/380 |
| 5,109,408 | 4/1992 | Greenspan et al. | 379/188 |
| 5,155,342 | 10/1992 | Urano | 235/380 |
| 5,228,075 | 7/1993 | La et al. | 379/199 |
| 5,265,155 | 11/1993 | Castro | 379/144 |
| 5,266,782 | 11/1993 | Alanara | 379/144 |

*Primary Examiner*—Stephen Chin
*Assistant Examiner*—Vijay Shankar
*Attorney, Agent, or Firm*—Kenneth P. Glynn

[57] ABSTRACT

The present invention method provides a limited access massage service to a plurality of end-users and uses existing telecommunication lines with a switching network and a computerized central switching station to establish a billing system for sponsors and to form an account for each sponsor purchasing subsequent usage relating to at least one third party telephone number, the usage being based on a predetermined bulk rate for consumption of user time over a preset time period. It also includes distributing a user unit to each of a plurality of end users for calling the at least one third party telephone number. Each end-user is given the third party telephone number, and must provide to the system at least one unique identification number. In connection with the billing system, the computerized central switching station is programmed to permit a call of a preset message limit to be made by each end user to the third party phone number provided, based on the distributed user unit, accessed only by the end user providing to the computerized central switching station a unique identification number. In response to an end user calling the third party telephone number, a predetermined message is provided with a preset limit, the call is terminated and an appropriate time amount is charged to the account of the sponsor. The messages record of each consumed user unit is captured by the system and may be used by the sponsor for database marketing.

28 Claims, 5 Drawing Sheets

METHOD OF PROVIDING MESSAGE SERVICE FOR PINLESS LIMITED ACCESS TELECOMMUNICATIONS

BACKGROUND OF THE INVENTION

1. Field of the Invention

The present invention involves a method of providing a message service for prepaid telecommunications wherein end users are provided a user unit for utilizing a single phone number for a single use to access a predetermined message wherein the users must provide unique identifying numbers which are not centrally created P.I.N.'s.

2. Information Disclosure Statement

Various systems used for controlling, billing and blocking usage of telecommunications systems using computerized central switching stations have been developed. The following is representative of the prior art:

U.S. Pat. No. 5,265,155 to Peter D. Castro describes a method and apparatus for prepayment of telecommunication connections between two telecommunications devices which involves storing telecommunication-time data representative of a prepurchased amount of time available for payment of telecommunications connections in a switching network. At the initiation of the first telecommunication device, a connection is established between the first and second telecommunication devices so that a telecommunication process can be conducted therebetween. The telecommunication connection between the first and second devices is terminated in response to termination of the telecommunication process. The time duration of the connection is measured. The stored telecommunication-time data is processed to indicated a decrement in the available telecommunication-time, which is essentially equal to the measured time duration of the connection.

U.S. Pat. No. 5,228,075 to Sang T. La et al. describes a telephone set capable of selectively accepting callers and enabling partial recognitions of callers. The telephone set includes tip and ring terminals, a first analogue switch connected to the tip terminal, a first bridge diode connected to the first analogue switch and the ring terminal, a wave rectifying circuit connected to the first bridge diode, a microprocessor connected to the wave rectifying circuit and the first analog switch, an EEPROM connected to the microprocessor, a hook switch connected to the microprocessor, and a selecting switch connected to the microprocessor. It further includes a second bridge diode connected to the tip and ring terminals, a hybrid IC circuit connected to the second bridge diode, a DTMF decoder connected to the hybrid IC circuit and the microprocessor, a power supply means for supplying the required power to the internal circuits, and a second analogue switch and a microphone.

U.S. Pat. No. 5,109,408 to Steven L. Greenspan describes a call processing embodiment where customers are offered a special dialing plan where received numbers are processed such that a query of a database is defined when a prespecified access code, e.g. *66, is received, for example followed by a destination, but where call blocking is defined for a predefined plurality of destination numbers, e.g. all destination numbers beginning with 976 or 1-900 or all destination numbers beginning with 1, when such numbers are received without the prespecified access code. Illustratively, the database query may result in the customer being prompted for a personal identification number (PIN) and accordingly 976 or 1-900 access is thereby limited to those knowing the PIN. The database may perform other call screening and call management operations such as time of day or day of week screening or limiting the number or cost of 976 calls in a given time period.

U.S. Pat. No. 5,068,891 to Marvin Marshall describes an invention wherein the amount of credit available to a telephone travel card holder is determined immediately at the completion of a long distance call and the travel card is invalidated if no credit remains. Capture software captures call ticket data at the completion of a call and the ticket data is transmitted to a monitoring computer without delay. The monitoring computer calculates the amount of credit available to that caller and invalidates the travel card if no credit remains by transmitting a signal to all switching equipment stations throughout the telephone system.

U.S. Pat. No. 4,757,186 to Wolfgang Heberle et al. describes a method allowing the continued use of a credit card which has expired in terms of time or value units for automatic vendors which are in communication with a central evaluation location. The method allows a continuation of telephone calls, even with an expired telephone credit card, by debiting of the fee units used or made to the account of the card owner at the central evaluation location in a chronologically limited transition time after every service performance so that a call is not cut-off in the middle of a call.

U.S. Pat. No. 4,706,275 to Zvi Kamil describes a telephone system enabling prepayment for telephone calls, wherein special code and credit information is stored in memory in special exchanges and debited as the call progresses.

U.S. Pat. No. 4,162,377 to Allison B. Mearns involves a method for automatically processing call data from a Traffic Service Position System over Common Channel Interoffice Signaling facilities to a remotely located data base system to verify the entitlement of the caller to bill the call on a credit card, collect and charge-to-a-third number basis. The call data, dialed by the caller, comprises a credit card or station number together with a Personal Identification Number used by authorized callers in placing the special service calls. The data base system includes a memory table of authorized numbers to which the calls are charged and billed. The data base transmits Common Channel Interoffice Signaling direct signaling verification messages through the signal transfer system to the Traffic Service Position System signifying the entitlement and nonentitlement of the caller to the call service.

Notwithstanding the above prior art, there are no teachings or suggestions that would render the present invention anticipated or obvious.

SUMMARY OF THE INVENTION

The present invention is a method of operating a telecommunication system for providing a limited access message service to a plurality of end-users. Existing telecommunication lines with a telecommunication switching network and a computerized central switching station are used to establish a billing system for sponsors and to form an account for each sponsor purchasing subsequent usage relating to at least one third party telephone number, the usage being based on a predetermined bulk rate for consumption of user time over a preset time period. It also includes distributing a user unit to each of a plurality of end users for calling the at least one third party telephone number. Each end-user is given the third party telephone number, and must provide to the system at least one unique identification number. In connection with said billing system, the computerized central switching station is programmed to permit a call of a preset message limit to be made by each end user to the third party phone number provided, based on the distributed user unit, accessed only by the end user providing to the computerized central switching station a unique identification number. In response to an end user calling the third party telephone number, a predetermined message is provided in accordance with a preset limit, and the call is terminated and an appropriate time amount is charged to the account of the sponsor. The messages record of each consumed user unit is captured by the system and may be used by the sponsor for data base marketing. At the discretion of the sponsor, distributed user units may be reactivated through a credit billing system. The method may be used for many forms of commercial, religious and personal messages, be tied in with information procurement, product promotions, concerts, games, movies and other purposes and may be used to award bonuses, or to aid lost persons.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The present invention is a method of providing message services on a limited access basis through existing telecommunication systems which utilize computerized central switching stations. The method involves modifying the computerized central switching station to establish a billing system and to build an account for each of a number of sponsors who purchase subsequent system usage relating to one or more third party telephone numbers. The usage is based upon a predetermined bulk rate for consumption of user time over a preset time period.

In the present invention method, the sponsor, its agent, or the owner of the third party telephone number or its agent, distributes a user unit to a predetermined number of end users. These end users are provided the user unit along with the third party telephone number and these end users must also provide back to the system some identification number (or sequence of characters) which is unique to each end user and which the end user knows or has access to independent of the user unit, sponsor and third party telephone number. The term "unique identification number" as used herein shall mean a combination of characters, e.g. numbers, letters, letters and numbers, which is known and unique to the end user. It need not be absolutely unique to fit this definition, and such unique identification numbers are sufficient to utilize for this purpose in accordance with the methods of the present invention.

The computerized central switching station is programmed to permit a call of a preset message limit to be made by each end user to a third party phone number provided, based on the distributed user unit and accessed by the end user providing a unique identification number e.g. social security number, home telephone number, birth name and birth date, and credit card number, membership number, drivers license number, etc. Subsequent attempts by end users to access the preset message with the same unique identification number are blocked through computerized intercepts of either the incoming ANI (automatic number identification) or the unique identification number or a combination of both of these. At the discretion of the sponsor, any given user unit may be reactivated through modification of the central computer system, i.e. reprogramming or programming to respond to one or more preset requisites being satisfied.

Figure 1:
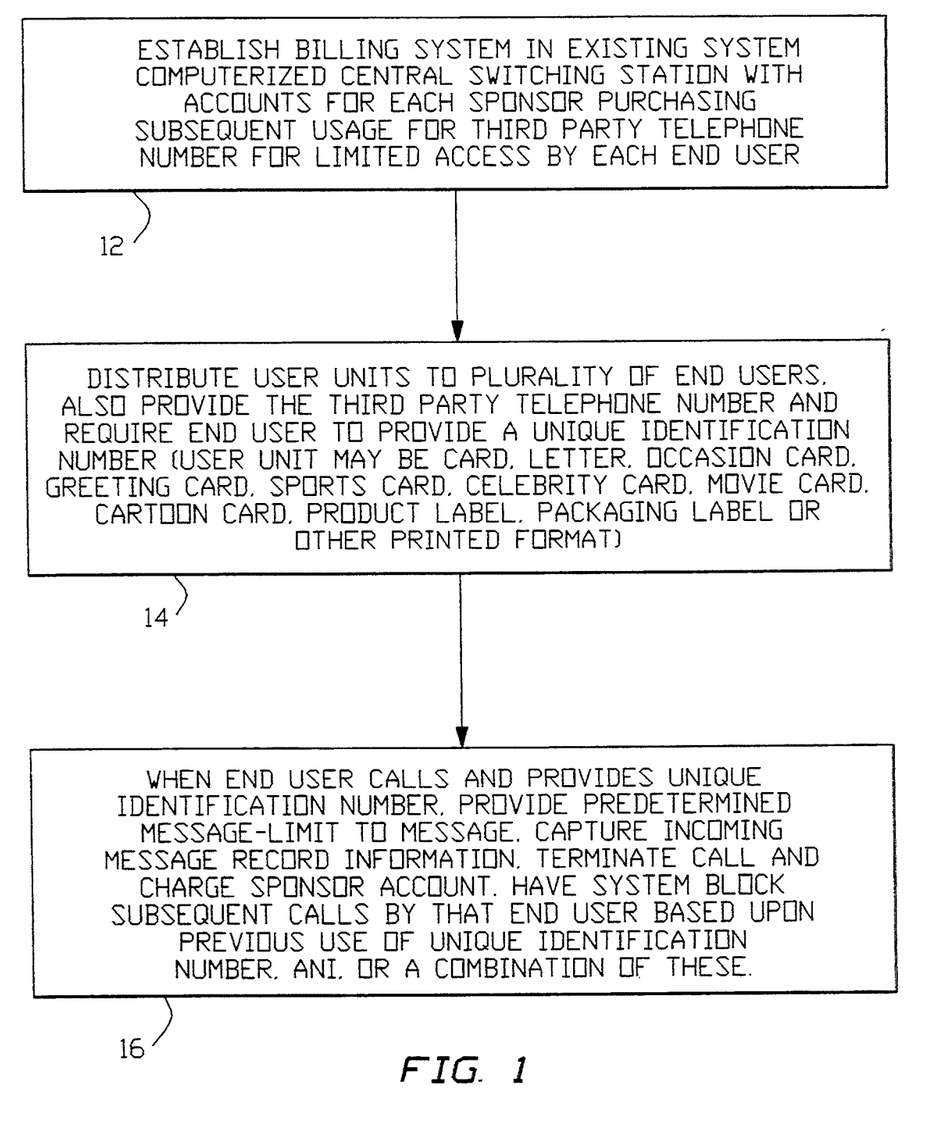
FIGS. 1, 2 and 3 show schematic diagrams of various embodiments of the present invention; and, FIG. 4 shows a schematic diagram of one detailed specific embodiment of the present invention method.

A predetermined message is provided to an end user calling the third party telephone number and the predetermined message is consistent with the preset message limit, after which the call is automatically terminated, and an appropriate time amount is charged to the account of the corresponding sponsor. The aforesaid steps are illustrated in FIG. 1 as steps 12, 14 and 16.

In preferred embodiments, the user units are distributed to end users by either a sponsor (or its agent) or a third party who owns the third party telephone number (or its agent) to end users for a fixed fee. The fixed fee is not based on the length of time of a given call but is a fee which is prepaid by the end user to permit a call. End user fees are independent of both the length of the message and the class of telephone service provided (e.g., 1+dial, 800, 900, etc.).

In other preferred embodiments, all automatic number identification message information of the end users is captured by the computerized central switching station and is provided to the sponsor.

In other preferred embodiments, the computerized central switching station is programmed to deny access to the predetermined message according to preset requisites by blocking any caller who has previously used the unique identification number and/or the automatic number identification for access to that predetermined message.

The predetermined message may be an entertainment message, an educational message, a religious message, a safety message to aid a lost person, a message with music, a message from a celebrity such as a sports figure, a hero, an author, an actor or other person. The predetermined message may relate to holidays, birthdays, anniversaries, graduations, thank you's, christenings or other special or notable occasions.

Figure 2:
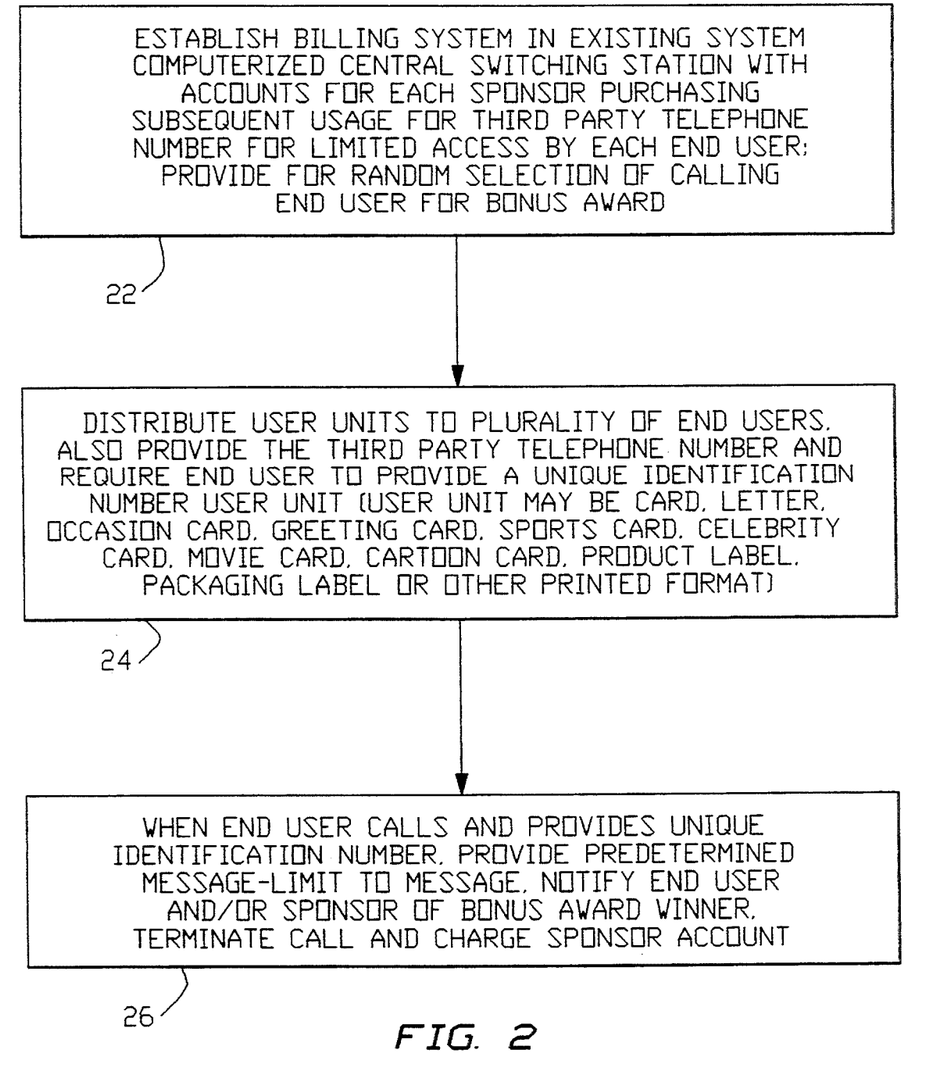

In other preferred embodiments, the present invention may be used to perform the aforementioned steps and to also randomly select one or more bonus award winners from actual caller end users and to then notify the winner(s) and/or the sponsor. This is shown schematically in FIG. 2 as steps 22, 24 and 26.

Figure 3:
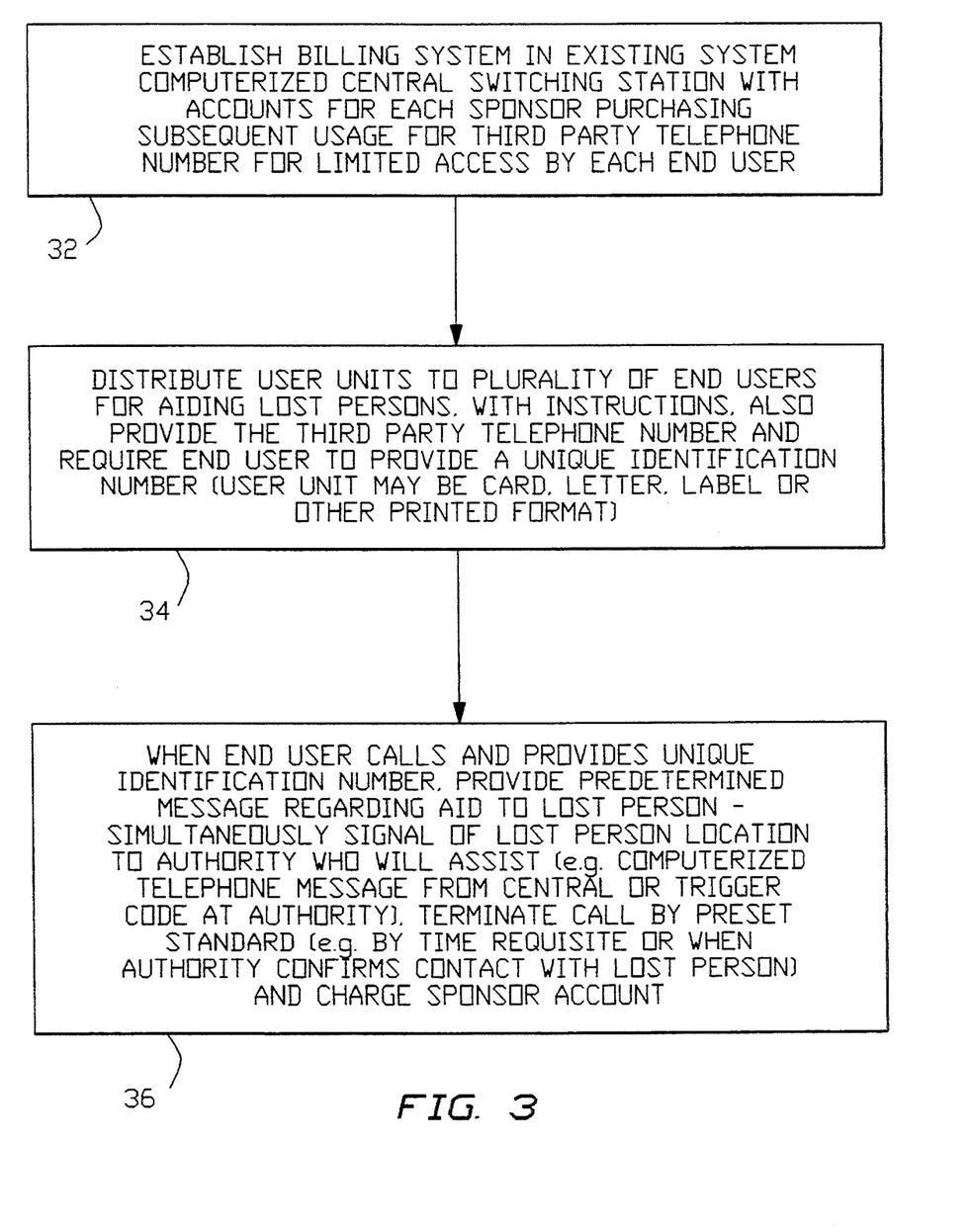

In yet other preferred embodiments, the present invention is used to aid lost persons and to notify an authority who would go to and assist the lost person. This is shown schematically in FIG. 3 as steps 32, 34 and 36.

The present invention user unit is generally in the form of printed material and may be a small, flat card, a membership card, a letter, a greeting card, a holiday occasion card or a special occasion card. Alternatively, it could be in the form of baseball or other sports cards, movie cards, cartoon character cards, or other specialty cards. It could otherwise be in the form of packaging labels, packaging inserts or any other written or printed format.

The present invention method includes embodiments wherein the user unit is capable of being reactivated at the discretion of the sponsor, typically upon a further payment by the end user or some other party via a credit card or some other payment means. Reactivating may be for any multiple of additional authorized access opportunities e.g. based upon passage of time, change of message, receipt of payment of a bill or invoice or donation, etc. The computerized system may optionally track the number of additional access units for a specific unique identifier or ANI and exhausts the user unit when all additional access opportunities have been consumed.

The following are examples of the present invention method:

EXAMPLE 1

TELETALKIE TM TRAILERS: TEE POCKET PREVIEW

The Pocket Preview is a totally unique way to advertise and promote motion pictures and their related products. For the first time, a consumer can have direct, immediate audio access to the story line of the motion picture, its characters or any other message regarding film promotion. In addition, the Pocket Preview can be used as a souvenir collectible, a user unit in the form of discount coupon card and a contest entry—all in one simple package.

The Pocket Preview allows the user to dial a toll free number and then the user provides a unique identification number, e.g. social security number. The central system records this social security number or home phone number for future purposes, e.g. blocking, rewarding, etc., and allows the end user to access a voice message (from any touch tone telephone). The voice message can provide actual script from the movie, or a "tease" line from one of the characters, or any other promotion. Making the phone call will not only give motion picture executives an instant measure of consumer interest, it can also be coupled with data base collection. Inquiries for the data base can be made to the end user before, during or after the recorded message or a combination of those. The Card will carry the movie logo and other advertising information. On the reverse, the Card can carry consumer discounts for use at the theater or with any of the cross promotional vendors associated with the movie which become valid only when the call is completed. The perceived value of the coupons on the card will far exceed the retail price of the card as a stand alone product.

EXAMPLE 2

TELETALKIE TM TALES: THE AUDIO COMIC BOOK CARD

The Audio Comic Book Card is a combination entertainment, promotional, merchandising and marketing device. This Teletalkie TM can be sold as a stand alone product or an insert into existing products. The user unit can be produced in the form of a credit card, collector's trading card, label, sticker or any other printed medium. It provides the purchaser with the ability to make one call to the number on the card. The unique identification number provided by the end user can be, for example, name and address with postal code, or home phone number. The technology prevents the user from making more than one call (or a specified number of calls).

Once the call is made, the caller hears one piece of an on-going story, coupled with a promotional message, a contest entry, or any other suitable announcement. All of this is designed to encourage the caller to purchase additional cards to continue to hear the story. A single story could involve multiple character cards, interwoven story lines or any other combination of themes and characters, requiring the purchase of many cards in a set.

The Teletalkie TM Audio Comic Book Card is not simply an audio text message. Each card becomes a collector item. Cards are sold in sequential series, character series or by subscription. Cards can also be used to test market new themes, characters or even new comic books and to act as live comment cards on existing issues. Once the caller is on line, the message can request data base information stimulated by a "surprise" offer when the data is given. The surprise can be anything from additional story lines to promotional giveaways. The Card can also be packaged within existing printed comic books, offering tangent plots, new developments, etc. Used creatively, the Card story can enhance the printed comic story, providing information not found in the printed material or developing plots only hinted at in the printed comic. Cards can also be used as the vehicle to provide coupon offers, discounts to purchasers of additional comic book materials, action figures, or any number of cross promotionals. Most importantly, every use of the Card provides the comic book publisher with a telephone number of a qualified buyer.

EXAMPLE 3

TELETALKIE TM TUNES: THE ROCK TALK CARD

The Teletalkie TM Rock Talk Card user unit allows the caller to hear the musical artist or member of the band talk about a new release or some other personal insight or message of interest. This message is coupled with a promotion, a contest entry, or a sales offer. The message can also ask for caller information, such as the caller's interest in purchasing the new CD, or a comment section on a song, etc. Once the caller is on line, the message can request data base information stimulated by a "surprise" offer when the data is given. The Card can also be packaged within existing media including Compact Discs, rock magazines, posters, music scores, etc. Cards can also be used as the media to provide coupon offers, discounts to purchasers of additional artist licensed products such as clothing, musical instruments, music videos, etc.

EXAMPLE 4

TELETALKIE TM TEAMS: THE SPORTS HERO CARD

Perhaps the largest market for Teletalkies is the existing sports card collectible market. With the Teletalkie TM, any sports collectible card will be the user unit and will allow the user to "talk" to a sports celebrity after providing a requested unique identification number. The Teletalkie allows every fan to "talk" to his or her hero. The Teletalkie can be used as a chase card in existing sports trading card products. It can be used as a premium at games in order to increase ticket sales. It can be used in cross promotionals with other products sold at the sports event. Because the Teletalkie message can be changed as required, listening to your hero can be as fresh and relevant as last night's game. The Teletalkie opens the door to an entirely new way to market sports. It can allow the interested consumer to listen to one of the contestants before the big event via a computerized message. Combined with co-sponsor offers, the Teletalkie can also deliver advanced ticket sales billed to the telephone and delivered to the caller's address—all with the touch of a button.

EXAMPLE 5

THE TELETALKIE SANTA CARD

The Teletalkie Santa Card user unit allows the child to speak his or her Christmas wish to Santa. In this application, the information spoken by the child is captured and digitally recorded. It is then matched to the unique identification number provided by the child, e.g., parent's name and address. This may be provided by the parent separately, e.g. a mail in tied to the home phone number matched to the caller ANI by the central computer system, or the parent may talk before the child talks, for example. A hard copy transcription of the child's wish can subsequently be sent to the parent, grandparent or relative who purchased the card. The entire package is designed to allow merchandisers a way to target specific potential purchasers with exact requests from children.

EXAMPLE 6

Application of the wish card to the Premium/Incentive market.

By allowing the relatives of participants in incentive programs to express their wishes in this unique format, the Premium/Incentive (herein "P/I") firm can capture merchandise data directly from the potential buyer. If the user unit card is provided by the P/I firm for each participant, the requested end user identification number identifies the participant. Cards can be given in quantities for use by relatives, friends, etc. but in every case, the unique identifier may include information requested which identifies the incentive program participant.

When the information is captured, the recording and the unique i.d. number are stored so that the P/I firm knows which participant potentially wants what merchandise. The P/I firm uses this information to notify participants of the individual's desires.

EXAMPLE 7

THE GREETING CALL

Used in a variety of applications, this Teletalkie TM user unit is priced so that the focus of the buyer's attention is placed on the desirability of the voice to be heard, not on the actual cost of the call. The card can be coupled with other promotional or bonus items, but its appeal is in the message received. In the greeting card market, the Teletalkie can provide a message from a famous person to anyone who purchases or receives the card, for example, Marilyn Monroe wishing you a happy birthday, or Bing Crosby singing "White Christmas" to you, or Axl Rose telling you to take it easy today. The Teletalkie is also capable of complete customization, allowing the consumer to put his or her own picture on the card and have the Teletalkie deliver a personal message from the buyer to the card recipient.

EXAMPLE 8

THE SPECIALTY CARD

Using the existing technology, this user unit card variation simply requires printing to specific customer orders in pre-sold quantities. In the hotel and travel market, specialty cards can be issued in small quantities that carry a specific customer logo and message. There are literally dozens of applications of such a product, including specialty events, tourist and travel applications, gift giving, etc. This card could be used with major metropolitan governments and other organizations for a variety of promotional and charitable projects.

EXAMPLE 9

THE BUSINESS CARD

The user unit card could be printed with any company logo, employee name, etc. so that the card itself would become a business card. In this application, the Teletalkie number is designed to connect the caller with the person on the business card from any location anywhere in the U.S.A. without cost to the caller and without the expense of the usual 800 number service. This Teletalkie TM becomes the personal "Easy Reach" access of every business call. The technology is available to provide a message from the sponsoring business every time the client uses the card.

EXAMPLE 10

THE BOOK TALK CARD

The Teletalkie TM can be used to advertise and promote new books. When a book is in the promotional stage, the message can be a part of the text, a statement of the author or any number of marketing messages. The Teletalkie TM user unit can be sent to bookstores in advance of the book release, with the option at the end of the message to order the book by simply pressing a key on the telephone pad. Through the requested unique identification number provided by the end user (as in all examples of this invention), publishers can capture two important data bases: buyers who demonstrated interest and buyers who requested a sale. Both types of consumers can also be offered discounts on other publications, catalogues, etc.

EXAMPLE 11

THE CONCERT CARD

Exactly like the Sports Event Teletalkie TM described above, applied to Rock Concerts.

EXAMPLE 12

THE CALL TO GIVING

This Teletalkie TM user unit provides the caller with a message concerning a charitable cause, allowing the caller to give directly to the organization by completing the response through the touch tone pad. Donations can be billed to the telephone bill or taken by transferring to a live operator.

EXAMPLE 13

THE HELP CARD

A sponsor or third party phone number owner could produce an entire parents' package user unit including child registration, name, address, telephone contacts and emergency contact. The package includes a business reply return form. All of this is entered into the data base in conjunction with the identification number, e.g. phone number and birth date, requested for each unique child. The child retains the third party telephone number and the parent may write in the unique identifier so that the child has this in a printed form, contained in either a wrist band, locket or child's wallet.

The central data base library stores a recognizable voice such as ET or Kermit saying the child's name, connected with the unique identifier, in a message record stored in the computer data base.

When the child calls the help line:

The voice answers, speaking the child's name (using digital storage technology, recalling the name from the information sent in by the parent).

The computerized central switching station looks in a separate data base to find the closest police station, determined by the ANI identification of the incoming call. The system dials the police number, identifies the call as a child in trouble and connects the child's call directly to the police on the line. The system then dials the parent's number, playing a message that the child has called for help and is being referred to the police at the police telephone number.

The program notifies parent's by mail that the help card has been used and offers a re-issue issue. The card can only be used once and must then be resubscribed. This prevents abuse.

EXAMPLE 14

OLIVER TWIST FOR GOVERNOR" CAMPAIGN

Figure 4:
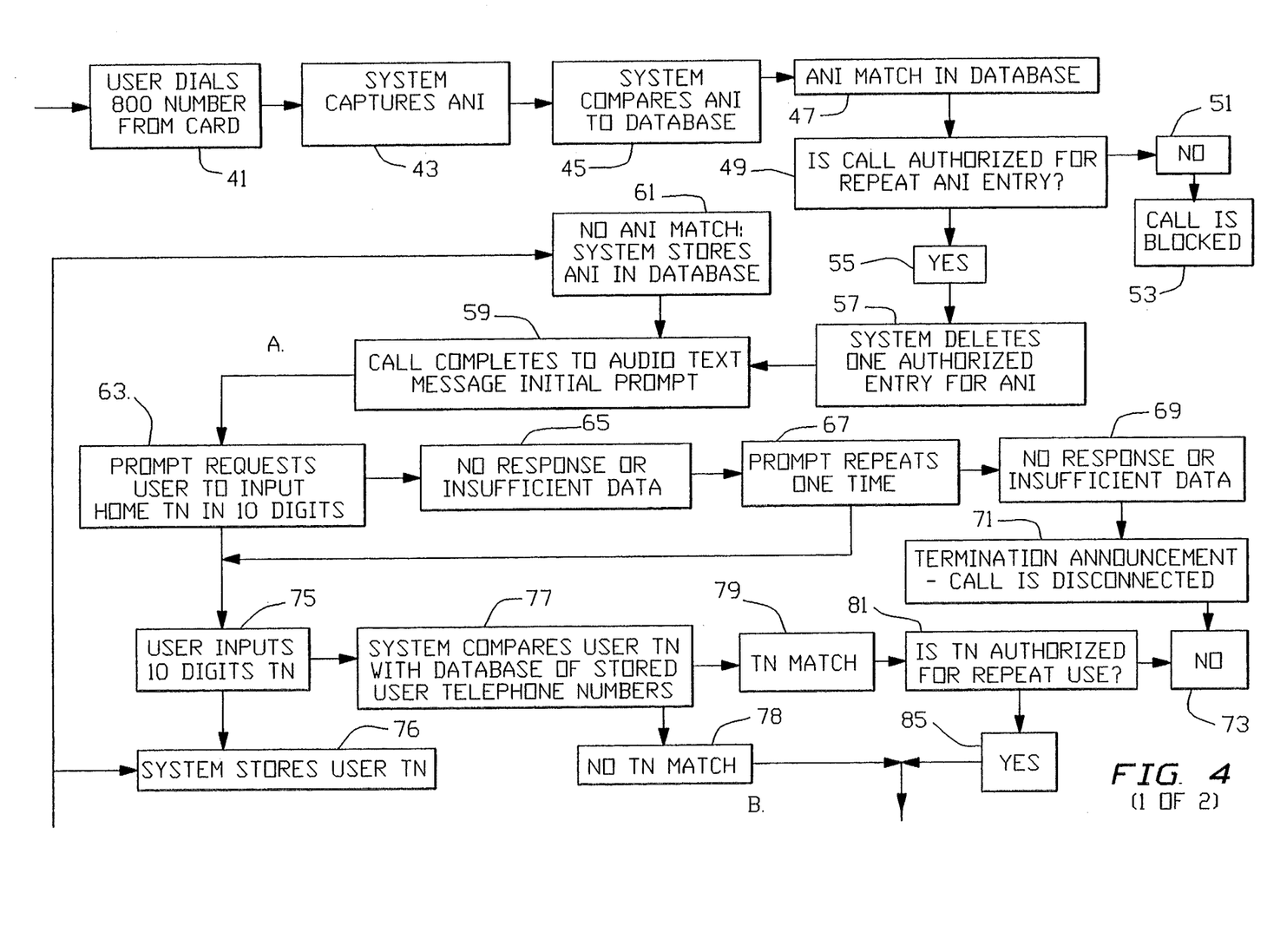

FIG. 4 shows a detailed flow diagram for a present invention example involving an election campaign in support of a particular candidate (here, a hypothetical Oliver Twist for Governor). In this example, an end user dials an 800 number from the user unit card (41), and the computerized central switching system will capture the ANI (43), i.e. a unique identification number inherently provided by the end user in the form of the ANI. The system then compares the ANI to its database (45). If there is an ANI match in the database (47), the system determines whether or not the call is authorized for repeat ANI entry (49). If no (51), then the call is blocked (53). If yes (55), the system deletes one authorized entry for that ANI (57), and the call is completed to the audio text message initial prompt (59). If there is no ANI match, the system stores the ANI in its database (61) and the call is completed (59). Once a call is completed (59), a prompt requests the end user to input his/her HOME telephone number in 10 digits (63). If no response or insufficient data (65), the prompt repeats one more time (67). If there is still no response or insufficient data (69), then there will be a termination announcement—call is disconnected (71), no further activity is allowed (73). When the user inputs the 10 digit home telephone number (75), the system stores this telephone number (76), and the system compares the end user telephone number with its database of stored user telephone numbers (77). If there is no telephone number match (78), or if there is a telephone number match (79) and the telephone number is authorized for repeat use (81), then yes (85), the call is completed and an audio text message (87) from Oliver Twist is run. A prompt in the message queries the caller for a campaign contribution (89). The caller inputs a key indicating his/her desire to make a contribution (91). If there is no response (92), a thank you announcement is made and the call is terminated (94). If there is a positive key response (91), the call is transferred to a live operator to take Mastercard/Visa information (93) for the contribution. The contribution is received (95), and the ANI and home telephone number of the end user caller is reactivated in the database (unblocked) so that the end user contributor can call again (97).

Obviously, numerous modifications and variations of the present invention are possible in light of the above teachings. It is therefore understood that within the scope of the appended claims, the invention may be practiced otherwise than as specifically described herein.

What is claimed is:

1. A method of operating a telecommunication system for providing a message service to a plurality of end-users, which comprises:
   (a.) utilizing a telecommunication system having telecommunication lines with a telecommunication switching network and a computerized central switching station to establish a billing system for sponsors and to form an account for each sponsor purchasing subsequent usage relating to one or more third party telephone numbers, said usage being based on a predetermined bulk rate for consumption of user time over a reset time period;
   (b.) distributing a user unit to each of a plurality of end users for calling said one or more third party telephone numbers and providing to each said end-users said one or more third party telephone numbers, and requiring each end user to provide to the system at least one unique identification number, said at least one unique identification number being unique to each said user unit;
   (c.) in connection with said billing system, programming said computerized central switching station to permit a call of a preset message limit to be made by each end user to said third party phone number provided, based on said distributed user unit, accessed only by said end-users providing the requested unique identification number; and,
   (d.) in response to an end user calling said third party telephone number and the end user providing the requested unique identification number, then providing a predetermined message to said end user in accordance with said preset message limit, automatically terminating said call, and charging an appropriate time amount to said account of said sponsor.

2. The method of claim 1 wherein said user unit distributed to said each of a plurality of end-users is sold for a fixed fee by one of: said sponsor, agents of said sponsor, a third party who owns said third party telephone number, and agents of said third party.

3. The method of claim 1 wherein said method further includes capturing Automatic Number Identification message information and providing same to said sponsor.

4. The method of claim 1 wherein said method further includes programming said computerized central switching station to deny access to said predetermined message according to preset requisites selected from the group consisting of:
   (a) by blocking any caller who provides a unique identification number which has previously been provided to access said predetermined message, (b) by blocking access to said predetermined message by denying access based upon previous use of the same ANI, and (c) by blocking access based upon a combination of previous uses of both a unique identification number and ANI.

5. The method of claim 1 wherein said user unit is capable of being reactivated at the discretion of the sponsor.

6. The method of claim 1 wherein said user unit is reactivated automatically in response to a preset requisite being satisfied.

7. The method of claim 1 wherein said message is selected from the group consisting of an entertainment message, an educational message, and a religious message.

8. The method of claim 1 wherein said message is a safety and informational message to aid a lost person.

9. The method of claim 1 wherein said message includes music.

10. The method of claim 1 wherein said user unit is distributed in the form of printed matter.

11. The method of claim 10 wherein said user unit is distributed as a user card.

12. The method of claim 11 wherein said user card is a greeting card.

13. The method of claim 12 wherein said greeting card is a holiday occasion card.

14. The method of claim 13 wherein said message provided relates to a holiday message corresponding to said holiday occasion card.

15. The method of claim 14 wherein said holiday message is selected from the group consisting of Christmas, Hanukkah, New Years, Easter, April Fool's Day, July 4th, Labor Day, Halloween and Thanksgiving messages.

16. The method of claim 12 wherein said greeting card is a special occasion card.

17. The method of claim 16 wherein said special occasion card is selected from the group consisting of birthday, anniversary, graduation, Mother's Day, Father's Day, christening and thank you cards.

18. The method of claim 16 wherein said message provided relates to a special occasion method and corresponds to said special occasion card.

19. The method of claim 11 wherein said user card is a collectable card.

20. The method of claim 19 wherein said collectable card is selected from the group consisting of sports cards, movie cards, television program cards, celebrity cards and cartoon cards.

21. The method of claim 19 wherein said message provided relates to said collectable card.

22. The method of claim 21 wherein said collectable card is a sports card which includes a sports figure and said message includes a recorded message from said sports figure.

23. The method of claim 1 wherein said computerized central switching station is programmed to include a program of chance to randomly select a particular caller from collected unique identification numbers for the purpose of awarding the selected caller a prize.

24. The method of claim 23 wherein said selected caller is notified automatically by said programmed computerized central switching station that the selected caller has won a prize by providing a predetermined special message to the selected caller.

25. The method of claim 23 wherein said sponsor is notified by the computerized central switching station as to unique information identifying the source of the selected caller.

26. The method of claim 1 wherein said method is developed for aiding and locating a lost person and includes the steps of:

(e) providing said user unit to individual persons with instructions for use when that person is lost;

(f) providing a preselected message to a caller thereto so as to include instructions as to how to proceed relative to being lost;

(g) utilizing said computerized central switching station to identify the location from which said caller is calling; and, (h) immediately provide said location to an authority who will proceed to assist said caller.

27. The method of claim 26 wherein said step (h) includes transmission of location and related information to a local law enforcement authority.

28. The method of claim 26 wherein said step (h) includes transmission of at least a caller's location to a central location specifically established to aid lost persons.

* * * * *